PROCESS READER

Filed May 26, 1967 4 Sheets-Sheet 1

INVENTORS
HAROLD M. WHITEHEAD
WALTER G. FREIDHOFF
BY Bruce L. Lamb
ATTORNEY

INVENTORS
HAROLD M. WHITEHEAD
WALTER G. FREIDHOFF
BY
Bruce L. Lamb
ATTORNEY

INVENTORS
HAROLD M. WHITEHEAD
WALTER G. FREIDHOFF
BY Bruce L. Lamb
ATTORNEY

Jan. 20, 1970 W. G. FREIDHOFF ET AL 3,490,160

PROCESS READER

Filed May 26, 1967 4 Sheets-Sheet 4

HAROLD M. WHITEHEAD
WALTER G. FREIDHOFF
INVENTORS

BY Bruce C. Lamb

ATTORNEY

United States Patent Office 3,490,160

Patented Jan. 20, 1970

3,490,160

PROCESS READER

Walter G. Freidhoff and Harold M. Whitehead, York, Pa., assignors to The Bendix Corporation, a corporation of Delaware Filed May 26, 1967, Ser. No. 641,552
Int. Cl. G09f *11/00, 11/10*
U.S. Cl. 40—53 9 Claims

ABSTRACT OF THE DISCLOSURE

A process reader including a rotatable drum upon whose surface a prepared process sheet having detailed process instructions printed thereon is fastened. Timing indicia are fastened onto the sheet in spaced relation with each instruction in a predeterminable pattern correlative to the time allotted to perform the step or operation directed to be performed by the instruction. A hood, having a slot through which a single instruction may be viewed, is positioned over the drum and thereon attached process sheet. A sensor, located externally to the drum and driven through flexible linkages by a motor located inside the drum, responds to the timing indicia so as to cause the motor to rotate the drum and attached process sheet thereby exposing the process instructions in succession, through the slot in the hood, and holding each instruction exposed in the viewing slot for a predetermined time.

BACKGROUND OF THE INVENTION

In accomplishing an assembly or test function where a single worker must perform a number of distinct sequentially related operations, it is imperative that the worker actually perform these operations properly in a predetermined sequence without omitting any steps or operations. The instructions for performing these operations and the sequence of performance are usually prepared by persons skilled in this technology, such as industrial engineers. The instructions are normally printed on a process sheet which is posted in a conspicuous place at the station where the particular function is to be regulated, so as to be readily and conveniently available to the worker at that station. Where improved methods of assembly or test are found or operational steps are reallocated among the various stations, a new process sheet might be prepared incorporating and reflecting the changed function to be performed at the subject station, and the old process sheet will be replaced by the new process sheet. Since the process sheet contains all the instructions as to the various operations to be performed at that station and is fully exposed to the worker, the worker must keep track of where he is on the process sheet and it is up to the worker to ensure that he has performed each of the operations required and that he has performed them in the proper sequence. Additionally, the time which a worker will spend on a given operation is left solely to the discretion of the worker. It has been discovered that for most economical operation of an assembly or test station, the given operational steps must be performed within a given period of time, which time is highly predictable by one skilled in predicting these times such as a time and motion engineer. If the time required to perform the operational steps exceeds the predicted time, the probability of that operational step being performed successfully by that particular worker involved decreases as time spent in attempting to perform it increases. This is so because the reason the worker was not able to perform the required step in the allotted time was most likely due to either an apparent or latent fault in the work-piece itself which can most economically be corrected at a repair station by a trained repair man or trouble shooter rather than at the assembly station by the assembly worker.

It is apparent that to perform the assembly or test function described in the most efficient manner, the instructions should be exposed to the worker one at a time in a timed sequence.

Certain process readers have been designed and are commercially available which will present operational instructions to a worker in a predetermined sequence. These readers may employ film strips or photographic slides. A single instruction of the particular process to be controlled is recorded on each film strip frame or photographic slide. A worker operated control steps the reader through the various instructions. In essence, the worker controls his own rate of output, which, as has been previously discussed, often forces an assembly worker, albeit unintentionally, into the role of a trouble shooter or repairman with resultant uneconomical operation of the assembly facility.

Additionally, the process instructions being recorded on a film strip or slides, are relatively expensive to prepare or change once prepared. This type reader is therefore not particularly suited to use on short production runs or to use at the start up of longer production runs when frequent process changes are common. It is therefore an object of this invention to provide a process reader which will present the individual instructions of a process to a worker in the proper and predetermined timed sequence using a process sheet which is simply, easily and economically prepared.

It shall be a further object of this invention to provide simple means of changing the process instructions presented to the worker and the timing thereof.

Another object of this invention is to provide a simple means of preparing process sheets which have both the instructional process information and timing data contained thereon.

SUMMARY OF THE INVENTION

Accordingly, a process reader is hereby disclosed wherein a generally translucent process sheet having written or printed thereon the process to be performed at a given work station, the process being broken down into its individual instructional steps, is fastened to a light conductive rotatable drum. The process sheet also has fastened thereon and associated with each individual instructional step printed thereon, a pair of opaque indicia whose spacing is proportional to the amount of time their associated individual instructional step will be exposed to the worker at the work station. A hood having a slot through which only one individual instructional step can be seen is drawn over and spaced slightly away from the drum and the thereon fastened process sheet.

An electric timing gear motor having both a rubber-tired disk and a single output bevel gear fastened to its output shaft, is pivotally mounted inside the drum and is driven to one or another of two stable positions by an electrical solenoid. In the first of these positions the rubber-tired disk is forced against the inside periphery of the drum so as to rotate the drum and the thereon fastened process sheet. In the second position, the aforementioned output bevel gear is made to engage a mating bevel gear which is attached to a drive shaft extending out of the drum.

A sensor, suitably a light sensitive photocell, is slidably mounted adjacent and exterior to the drum and flexibly linked by a wire to a capstan mounted on the aforementioned drive shaft extending out of the drum, whereby the wire is wound onto the capstan as the drive shaft is rotated through the mating bevel gears by the timing motor, so as to cause the photocell to traverse the drum axially, scanning the drum and process sheet mounted thereon. A light bulb mounted inside the drum illuminates its interior so that the photocell is normally excited by the light falling upon it through the translucent process sheet and becomes quiescent when it views one of the aforementioned opaque indicia. The photocell is arranged in logic circuitry so that it may properly control the solenoid and hence the timing motor in response to the location of the indicia.

DESCRIPTION OF THE PREFERRED EMBODIMENT

Figure 2:
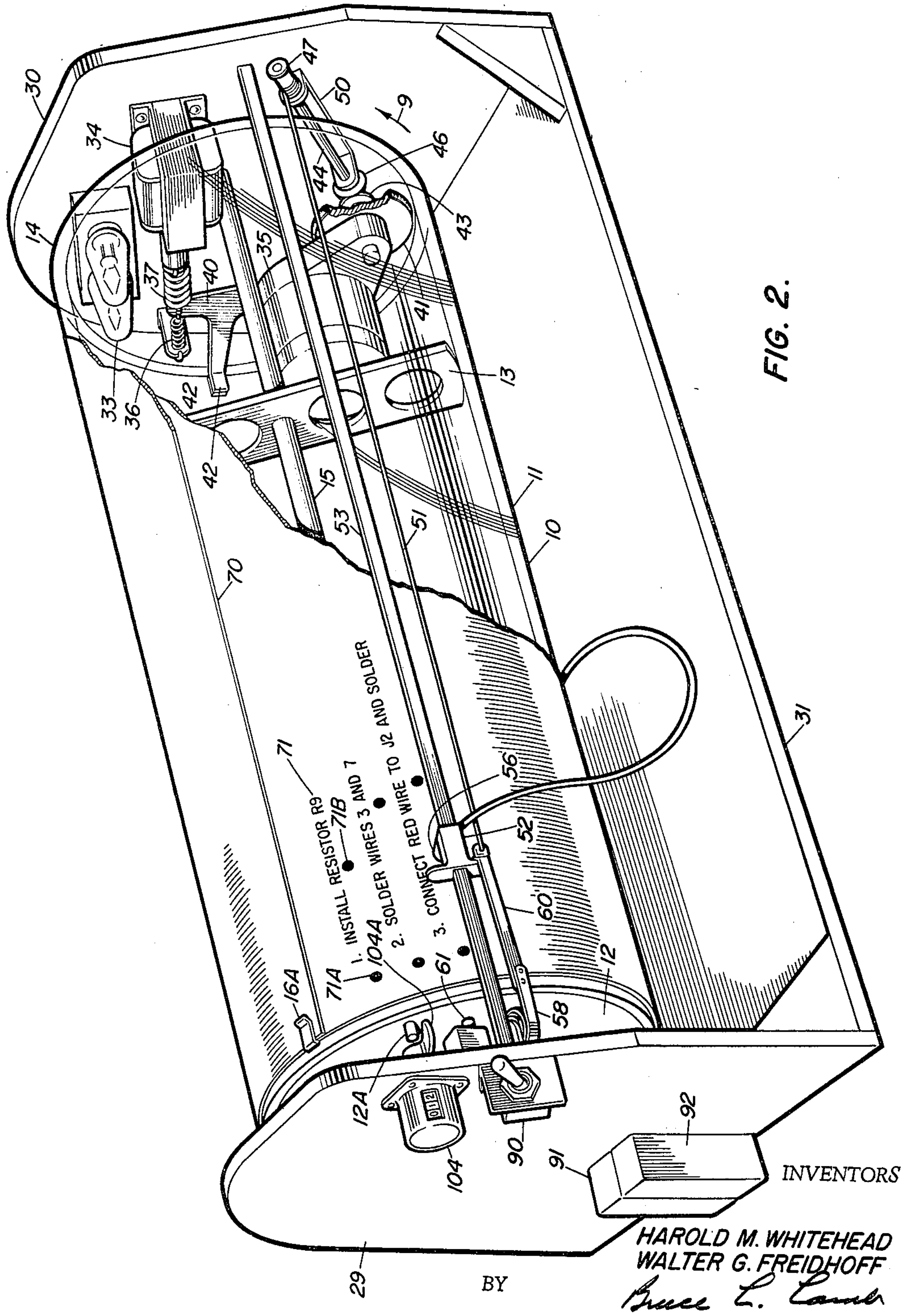
FIG. 2 is similar to FIG. 1 with the hood removed and portions of the device broken away to reveal its interior.

Referring to FIG. 2, the process reader drum 10 consists of a transparent cylindrical section 11 and hubs 12 and 13 which are freely rotatable about axis 15. It will be noted that hub 13 has been perforated and is located away from end 14 of drum 10 allowing end 14 to be open. Axes 15 is rigidly held by end plates 29 and 30 which along with base 31 make up the support frame of the process reader.

Figure 4:
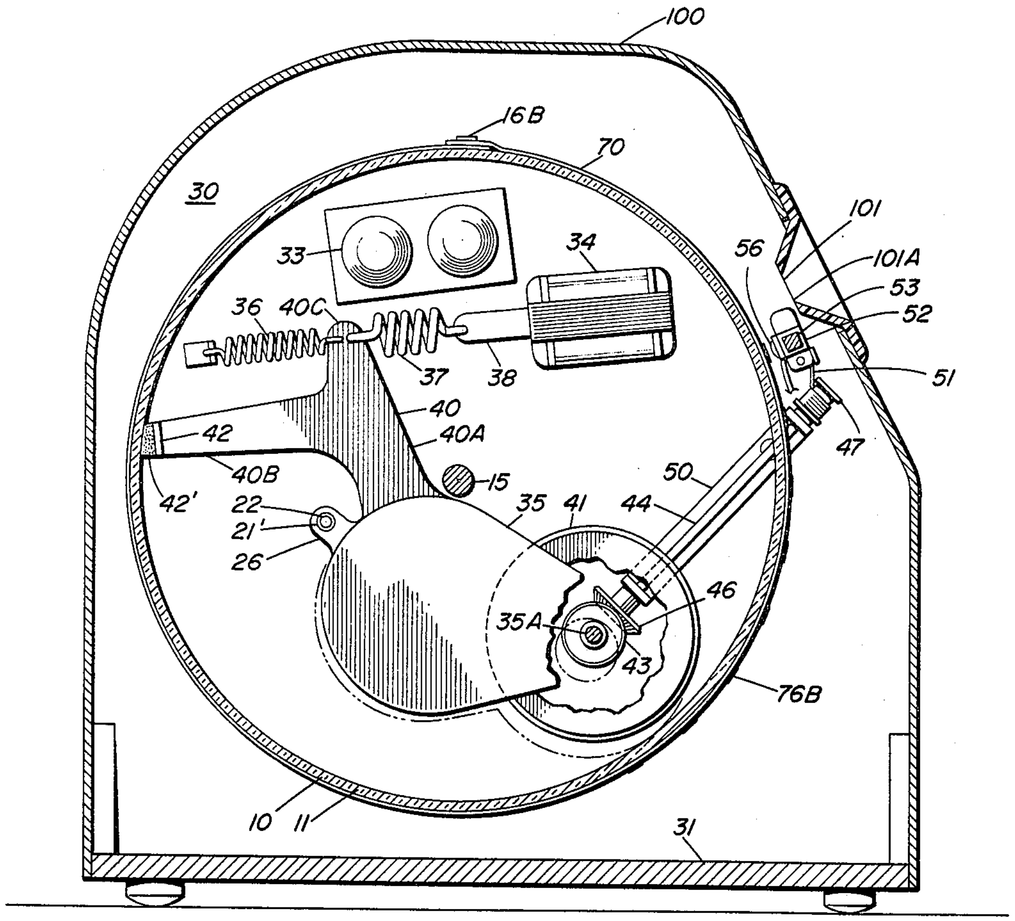
FIG. 4 is an end view of the present invention.

Referring to FIG. 4, there is seen located inside the aforementioned open end 14 of drum 10 and rigidly mounted to end plate 30 a light source 33, a solenoid 34 and a pivot pin 22. Gear motor 35, including bearing boss 26 in which is located bearing 21' and through which pivot pin 22 is disposed, is thereby freely pivotable about pivot pin 22.

Gear motor 35 is seen to have a T-shaped extension 40 which is attached at end 40C to solenoid armature 38 through spring 37 and to end plate 30 through spring 36. The force exerted by spring 37 is much greater throughout its effective working range than the force exerted by spring 36 throughout its effective working range. The branch arm 40B of T-shaped motor extension 40 terminates in pad 42 on which is fastened a brake material 42' such as rubber.

Concentrically mounted on gear motor output shaft 35A are bevel gear 43 and rubber-tired drive disk 41. A shaft support bracket 50 is rigidly attached to end plate 30. Supported shaft 44, freely rotatable in support bracket 50, carries at one end mating bevel gear 46 and at the other end capstan 47. Shaft support bracket 50 is so positioned that bevel gear 46 is located within the volume enclosed by drum open end 14 extended and capstan 47 is located outside of drum 10.

When solenoid 34 is energized, solenoid armature 38 is drawn into the solenoid, thereby drawing end 40C of T-shaped extension 40 toward the solenoid through spring 37. As has been previously mentioned, spring 37 is much stiffer than spring 36, so that spring 36 will flex and allow motor 35 to pivot about pin 22 until the rubber tire on drive disk 41 is forced against the inside cylindrical surface of drum 10. In like manner, brake 42' pivots away from contact with the inside cylindrical surface of drum 10, releasing drum 10, and bevel gear 43 pivots out of mesh from bevel gear 46, thereby releasing shaft 44. If gear motor 35 is energized, drive disk 41 will cause drum 10 to rotate about axis 15 in the direction of arrow 9.

When solenoid 34 is deenergized, armature 38 is released and drawn out of the solenoid by spring 36 which also, acting through T-shaped extension end 40C, causes gear motor 35 to pivot about pin 22 so as to disengage rubber-tired drive disk 41 from the inside cylindrical surface of drum 10 and force bevel gear 43 into mesh with bevel gear 46. Simultaneously, brake 42' is forced against the inside cylindrical surface of drum 10, thereby preventing further rotation of drum 10. If gear motor 35 is energized, bevel gears 43 and 46 will cause shaft 44 and thereon carried capstan 47 to rotate.

Referring once again to FIG. 2, capstan 47 is seen to be attached through a nylon string 51 to carriage 52, slidably mounted on bar 53 which is rigidly attached at its extremities to end plates 29 and 30. Carriage 52 includes a photosensitive device such as a photocell 56 which is so mounted and shielded as to view drum 10 radially with respect to the drum longitudinal axis. Carriage 52 is biased by spirally wound spring 58, which is similar to a typewriter carriage return spring, acting through flexible tape 60 so as to urge carriage 52 toward switch 61. As aforementioned, when solenoid 34 is deenergized, brake 42' bears against the inside cylindrical surface of drum 10 and bevel gear 43 is driven into mesh with bevel gear 46. Since in normal operation of the process reader, gear motor 35 is constantly energized, capstan 47 will be caused to rotate winding nylon string 51 thereon, thereby causing carriage 52 to be drawn toward capstan 47. As the carriage moves toward the capstan, photocell 56 scans along a longitudinal line with respect to drum 10. When solenoid 34 is energized, bevel gears 43 and 46 disengage, releasing shaft 44 and capstan 47, allowing the spring bias acting through tape 60 to return carriage 52 to switch 61, thereby activating switch 61.

Figure 3:
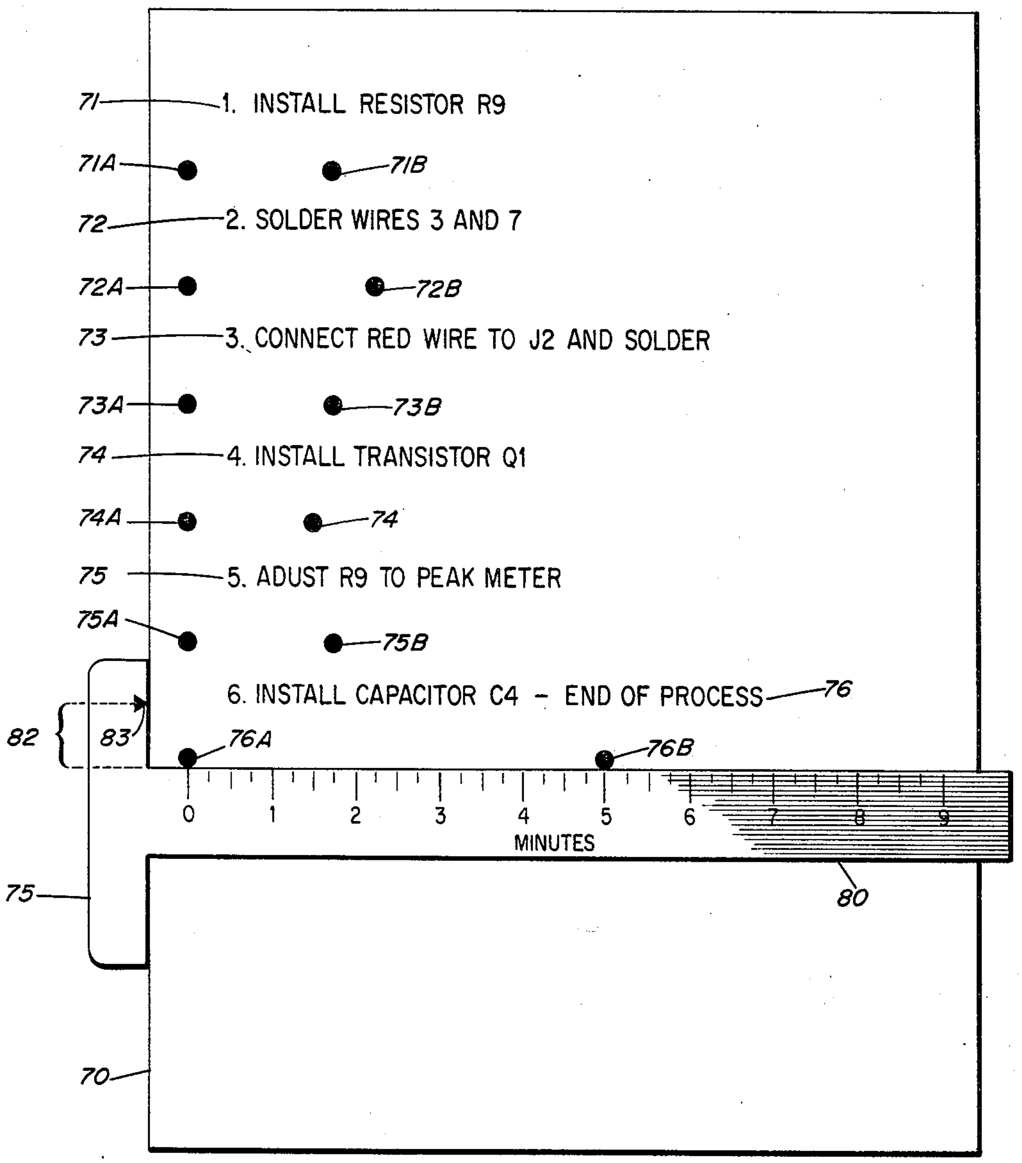
FIG. 3 is a typical process sheet prepared in accordance with the present invention and including a gauge.

A typical process sheet prepared in accordance with this invention is shown in FIG. 3. Before preparing a process sheet the process which is to be performed at a given work station is broken down by an industrial engineer or time and motion engineer into its individual process steps and a time assigned in which the step can be efficiently and economically performed. The instructions for performing each individual process step, 71 or 72 for example, is then typed on a standard light translucent sheet of paper 70 with double spacing between the last line of a preceding instruction and the first line of the succeeding instruction, the purpose of which will be made clear at a later time. A gauge 75, having a general T-square configuration, is calibrated along its straight edge 80 into minutes. After the process sheet has been prepared with the individual process steps correctly spaced, the gauge 75 is aligned along the left hand edge of the process sheet with gauge index 83 at the lower edge of the last line of a process step instruction which, in this example, is instruction 76. Straight edge 80 of gauge 75 has been designed to be two spaces 82 below cross bar index 83. The two spaces correspond to the double typewritten spaces between instructions. An opaque indicia 76A having an adhesive backing, suitably a small disk-shaped piece of masking tape, is fastened to the process sheet at the "0" straight edge mark as shown. In this example, five minutes has been allotted to perform the sixth process step. A second indicia 76B is therefore fastened to the process sheet at the 5.0 mark on straight edge 80. In like manner, other indicia 71A, 71B, etc. are attached to the process sheet. It should be clear that the spacing of the calibration marks on straight edge 80 is related to the diameter and speed of capsan 47 when activated.

Figure 5:
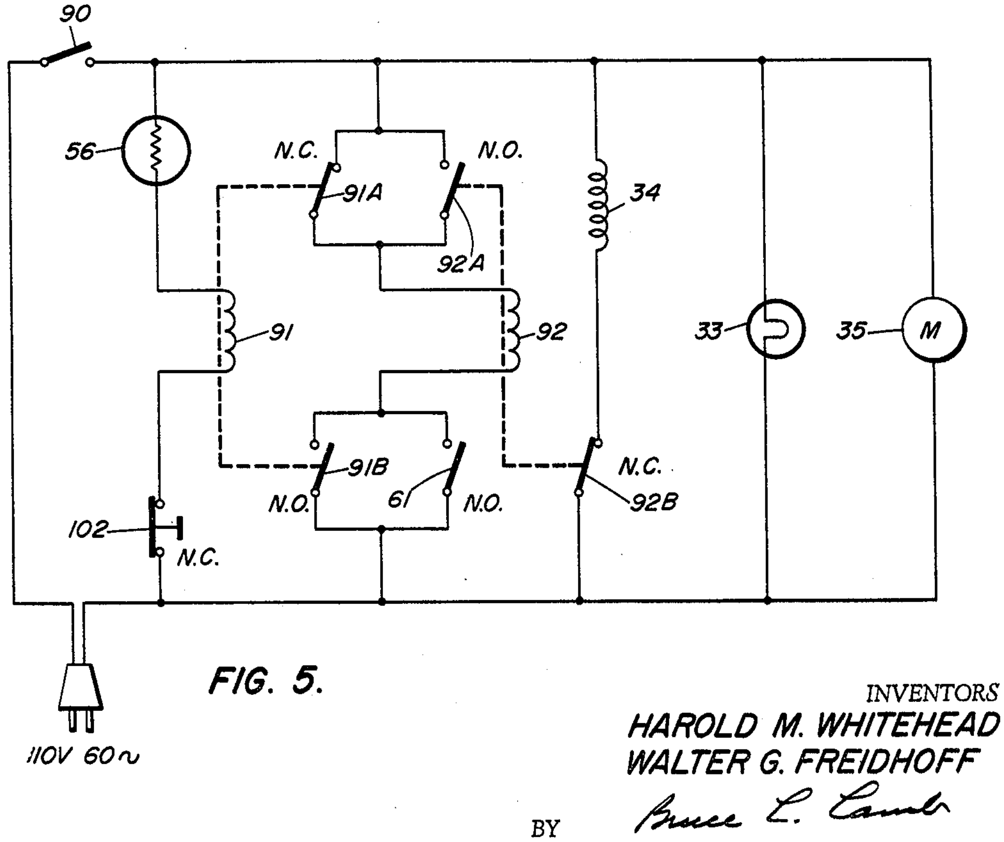
FIG. 5 is a schematic of the present invention.

Referring to FIG. 5 an on-off toggle switch 90 controls application of power to the process reader. When switch 90 is closed, motor 35 and light source 33 are energized. Photocell 56 is disposed serially with relay coil 91. When photocell 56 is exposed to light through the translucent process sheet, its resistance decreases so that relay coil 91 is energized. When photocell 56 views one of the aforementioned indicia 71A, 71B, etc., it is shielded from the light increasing its resistance, thereby deenergising relay coil 91.

With a prlocess sheet 70 attached to the process reader drum 10 by clips 16A and 16B as shown in FIG. 2, and carriage 52 against switch 61, solenoid 34 is energized causing drum 10 to rotate until an indicium, for example, 71A comes under photocell 56 causing its resistance to increase and relay coil 91 to deenergize. Relay contact 91A will thereby close and contact 91B open. Since carriage 52 is against switch 61,, relay coil 92 is energized through contacts 91A and switch 61, causing contacts 92A to close and 92B to open, thereby deenergizing solenoid 34. As prevciously mentioned, when solenoid 34 is deenergized, drum 10 stops rotating and capstan 47 is activated causing carriage 52 and thereon carried photocell 56 to scan horizontally across the process sheet. Switch 61 and indicium 71A are so designed that photocell 56 moves away from indicium 71A and views the translucent process sheet before switch 61 is deactivated. Relay 91 is thereby energized through photocell 56 closing contacts 91B before switch 61 opens, so that relay 92 remains energized through contacts 92A and 91B as the photocell continues to scan horizontally across the process sheet until the photocell views indicium 71B. Light to photocell 56 is thereby cut off, causing its resistance to increase so that relay coil 91 is deenergized. Contacts 91A immediately close and contacts 91B immediately open, deenergizing relay coil 92 causing contacts 92A to open and contacts 92B to close, activating solenoid 34. As has been discussed, this releases capstan 47 allowing carriage 52 to be drawn back to switch 61 by its spring bias. Additionally, rubbertired drive disk 41 is forced against and causes drum 10 to rotate. As carrage 52 returns to switch 61, photocell 56 once again views the lighted process sheet surface, again energizing relay coil 91 through photocell 56. Contacts 91A open and contacts 91B close. Since contacts 91A and 92A are both open, relay coil 92 remains unenergized. Carriage 52 and its biasing force are so designed as to cause carriage 52 to return to switch 61 before the next indicium 72A moves under photocell 56. Switch 61 therefore closes but contacts 91A and 92A being open, relay coil 92 remains deenergized and drum 10 continues to rotate until indicium 72A moves under the photocell. At this time the photocell resisitance increases causing relay coil 91 to deenergize opening contact 91B and closing contact 91A. Relay coil 92 is hence energized through contacts 91A and switch 61 and the timing sequence is repeated as before described.

It should now be obvious that the indicia located along the left hand side of the process sheet and generally designated 71A, 72A, etc. determine where drum 10 will stop rotating and that the spacing between horizontally located indicia determines for how long the drum will remain stationary.

Figure 1:
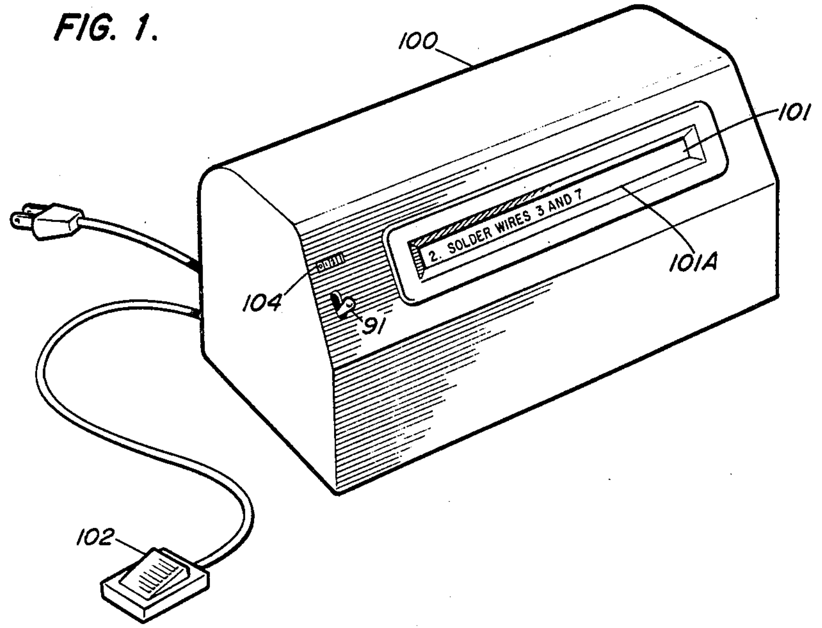
FIG. 1 is a perspective view of the process reader employing the present invention.

FIG. 1 illustrates the present invention with a hood 100 and a slot 101 disposed therein. The distance between the bottom edge 101A of the slot and photocell 56 is so arranged that when drum rotation is stopped by an indicium on the left hand side of the process sheet, the instruction associated with that particular indicium is visible through the slot.

A normally closed foot switch 102 which may also be seen in FIG. 5, is controlled by the worker at the station. If the worker completes a process step in less time than the time allotted to accomplish that step, he may momentarily depress the foot switch causing it to open. This deenergizes relay coil 91 and is the equivalent of photocell 56 encountering an indicium located to the right hand side of the process sheet, thereby allowing the next instruction to be rotated into place before the predetermined time for performing the previous process step has elapsed, hence effecting a time savings.

When the worker has a rejected work piece, such as when he cannot perform the operation called for in the allotted time, he can hold the foot switch depressed until the drum rotates to the first instruction. He then starts work on a new work piece, having placed the defective work piece in a rejection bin to be delivered to a repairman or trouble shooter.

Referring again to FIG. 2, pin 12A pressed into hub 12 engages a counter arm 104A to deflect once each complete rotation of drum 10, causing the total number of drum 10 rotations to be recorded on counter 104. In this way, the total number of work pieces handled by that work station can be easily determined.

Although we consider the above description and drawings to be the preferred embodiment of our invention, certain alterations and modifications will become apparent to one skilled in the art. Therefore, not wishing to limit our invention to the specific form shown, we hereby claim as our invention all the subject matter, including modifications and alterations thereof encompassed by the true scope and spirit of the appended claims.

The invention claimed is:

1. A process reader for a process sheet having process instructions and indicia associated with each said process instruction, comprising:

a support structure, a rotatable drum carried by said support structure and adapted to have said process sheet attached thereto, a sensor normally excited to a first state slidably mounted adjacent to said drum and arranged to sense said process sheet indicia when said process sheet is attached to said drum so as to excite said sensor to a second state, means biasing said sensor to a first position, means when enabled urging said sensor toward a second position, means cooperating with said indicia for exciting said sensor, and means responsive to the position of and to the state of said sensor for alternately rotating said drum and enabling said means urging said sensor.

2. A process reader as claimed in claim 1 with additionally a removable hood mounted on said support structure and a slot disposed in said hood so as to expose a predetermined area of said drum.

3. A process reader as claimed in claim 1 wherein, said drum has light conductive cylindrical walls, said sensor includes a photosensitive device, and said sensor exciting means includes a light source illuminating the interior of said drum.

4. A process reader as claimed in claim 1 with additionally means overriding said sensor for controlling said sensor responsive means.

5. A process reader as claimed in claim 1 with additionally means counting total revolutions of said drum.

6. A process reader as claimed in claim 2 wherein said indicia are arranged in spaced relationship with said instructions and with each other, said spaced relationship being determined in a direction normal to said sensor movement by the distance between said slot and said sensor and being determined in the direction of said sensor movement by the time duration said predetermined area is to be exposed.

7. A process reader as claimed in claim 1 wherein said rotating and enabling means includes switching means enabled when said sensor is in said first position, electrical logic circuitry responsive to the state of said sensor and the state of said switching means, a motor pivotally mounted on said support structure, a motor positioning means responsive to said logic circuitry whereby said motor is alternately driven to rotate said drum and enable said means urging said sensor.

8. A process reader as claimed in claim 7 wherein said drum has light conductive cylindrical walls, said sensor includes a photosensitive device, said sensor exciting means includes a light source illuminating the interior of said drum, said motor includes an output shaft and thereon concentrically mounted drive wheel and first gear, said sensor urging means includes an axle rotatably mounted on said support structure having a second gear mounted at one end and a capstan at the other end and additionally including a flexible linkage connecting said capstan to said carriage, and said motor is in spaced relationship with said drum and said gear.

9. In a process reader, the combination of:

a support structure, an axis carried by said support structure, a hollow drum having light conductive cylindrical walls and one end open rotatable about said axis, a bar mounted in external juxtaposition to said drum, carried by said support structure, a carriage slidably carried by said bar, a light source illuminating the interior of said drum, a photosensitive sensor, responsive to said light source, mounted on said carriage so as to view said drum radially with respect to said drum longitudinal axis, means biasing said carriage to a first position, switching means actuated when said carriage is in said first position, a drive motor pivotally mounted on said support structure within the open end of said drum and including an output shaft, a drive wheel and first gear concentrically mounted on said output shaft, a brake attached to said motor, an axle rotatably mounted to said support structure having a second gear mounted at one end and a capstan at the other end, a flexible linkage connecting said capstan to said carriage, means biasing said motor to a first stop wherein the brake abuts said drum and said first gear meshes with and drives said second gear whereby said flexible linkage is wound on said capstan urging said carriage to a second position, means urging said motor to a second stop wherein said drive wheel frictionally causes said drum to rotate, and circuitry responsive to the state and position of said sensor for controlling said motor urging means.

References Cited

UNITED STATES PATENTS

| | | | |
|---|---|---|---|
| 2,368,167 | 1/1945 | Sneram | 40—53 |
| 2,637,835 | 5/1953 | Davidson | 318—443 |
| 3,028,502 | 5/1962 | Schiffbauer et al. | |
| 3,280,251 | 10/1966 | Nakahara | 178—7.6 X |

EUGENE R. CAPOZIO, Primary Examiner

R. CARTER, Assistant Examiner

U.S. Cl. X.R.

250—219; 178—7.6; 40—33